(12) United States Patent
Hunter et al.

(10) Patent No.: US 7,725,703 B2
(45) Date of Patent: May 25, 2010

(54) SYSTEMS AND METHODS FOR SECURELY BOOTING A COMPUTER WITH A TRUSTED PROCESSING MODULE

(75) Inventors: Jamie Hunter, Bothell, WA (US); Paul England, Bellevue, WA (US); Russell Humphries, Redmond, WA (US); Stefan Thom, Snohomish, WA (US); James Anthony Schwartz, Jr., Seattle, WA (US); Kenneth D Ray, Seattle, WA (US); Jonathan Schwartz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1252 days.

(21) Appl. No.: 11/031,161

(22) Filed: Jan. 7, 2005

(65) Prior Publication Data

US 2006/0155988 A1 Jul. 13, 2006

(51) Int. Cl.
*G06F 21/02* (2006.01)
*G06F 21/22* (2006.01)

(52) U.S. Cl. .................... 713/2; 713/100; 713/170; 713/181; 713/193; 726/29; 726/34; 380/259

(58) Field of Classification Search .............. 726/4, 726/29, 34; 380/259; 713/193, 100, 170, 713/181, 2
See application file for complete search history.

(56) References Cited

U.S. PATENT DOCUMENTS

| | | | |
|---|---|---|---|
| 5,937,063 A | 8/1999 | Davis | 713/187 |
| 6,189,100 B1 | 2/2001 | Barr et al. | 713/182 |
| 6,327,652 B1 | 12/2001 | England et al. | 713/2 |
| 6,330,670 B1 | 12/2001 | England et al. | 713/2 |
| 6,643,781 B1 | 11/2003 | Merriam | 726/35 |
| 6,651,171 B1 | 11/2003 | England et al. | 713/193 |
| 6,684,326 B1 | 1/2004 | Cromer et al. | 713/2 |
| 6,757,824 B1 | 6/2004 | England | 713/156 |
| 7,117,376 B2 | 10/2006 | Grawrock | 380/277 |
| 7,216,369 B2 * | 5/2007 | Wiseman et al. | 726/34 |

(Continued)

OTHER PUBLICATIONS

Chuang, S.-C., et al., "A Case Study of Secure ATM Switch Booting," Proceedings of the Symposium on Network and Distributed System Security, San Diego, California, Feb. 22-23, 1996, 103-112.

(Continued)

*Primary Examiner*—Jung Kim
*Assistant Examiner*—Izunna Okeke
(74) *Attorney, Agent, or Firm*—Woodcock Washburn LLP

(57) ABSTRACT

In a computer with a trusted platform module (TPM), an expected hash value of a boot component may be placed into a platform configuration register (PCR), which allows a TPM to unseal a secret. The secret may then be used to decrypt the boot component. The hash of the decrypted boot component may then be calculated and the result can be placed in a PCR. The PCRs may then be compared. If they do not, access to the an important secret for system operation can be revoked. Also, a first secret may be accessible only when a first plurality of PCR values are extant, while a second secret is accessible only after one or more of the first plurality of PCR values has been replaced with a new value, thereby necessarily revoking further access to the first secret in order to grant access to the second secret.

20 Claims, 9 Drawing Sheets

U.S. PATENT DOCUMENTS

| | | | |
|---|---|---|---|
| 7,237,121 B2 | 6/2007 | Cammack et al. | 713/189 |
| 2002/0004905 A1 | 1/2002 | Davis et al. | 713/193 |
| 2002/0087877 A1* | 7/2002 | Grawrock | 713/200 |
| 2003/0046542 A1 | 3/2003 | Chen et al. | 713/176 |
| 2003/0233558 A1 | 12/2003 | Lieberman et al. | 713/189 |
| 2004/0003288 A1 | 1/2004 | Wiseman et al. | 726/30 |
| 2004/0117318 A1* | 6/2004 | Grawrock | 705/66 |
| 2004/0172534 A1 | 9/2004 | Ogata | 713/164 |
| 2005/0262571 A1* | 11/2005 | Zimmer et al. | 726/27 |
| 2006/0047944 A1 | 3/2006 | Kilian-Kehr | 713/2 |
| 2006/0053302 A1 | 3/2006 | Yasaki et al. | 713/183 |
| 2006/0064752 A1 | 3/2006 | Wang et al. | 726/19 |

OTHER PUBLICATIONS

Held, G., "Focus on: Encryption Plus," *International Journal of Network Maagement*, Jan.-Feb. 2002, 12(1), 61-66.

Taylor, K., et al., Protect Your Notebook [notebook security], *Personal Computer World*, Jul. 2004, 27(7), 107-109.

Yue-Zhi, Z., et al., "A Customizable Boot Protocol for Network Computing," *Journal of Software*, Mar. 2003, 14(3), 538-546.

In the United States Patent and Trademark Office, Non-Final Office Action Summary in re: U.S. Appl. No. 11/035,715, filed Jan. 14, 2005, 13 pages Jun. 18, 2008.

In the United States Patent and Trademark Office, Non-Final Office Action Summary in re: U.S. Appl. No. 11/036,018, filed Jan. 14, 2005, 14 pages, Jul. 23, 2008.

Trusted Computing Group (TCG), "Trusted Platform Module (TPM) Specification Version 1.2", https://www.trustedcomputinggroup.org/home.

In the United States Patent and Trademark Office, U.S. Appl. No. 11/035,715, "Systems and Methods for Boot Recovery in a Secure Boot Process on a Computer with a Hardware Security Module", filed Jan. 14, 2005.

In the United States Patent and Trademark Office, U.S. Appl. No. 11/036,018, "Systems and Methods for Updating a Secure Boot Process on a Computer with a Hardware Security Module", filed Jan. 14, 2005.

In the United States Patent and Trademark Office, U.S. Appl. No. 11/036,415, "Systems and Methods for Controlling Access to Data on a Computer with a Secure Boot Process", filed Jan. 14, 2005.

In the United States Patent and Trademark Office, U.S. Appl. No. 10/035,715, "Systems and Methods for protected operating system boot using state validation", filed Jun. 30, 2004.

* cited by examiner

SYSTEMS AND METHODS FOR SECURELY BOOTING A COMPUTER WITH A TRUSTED PROCESSING MODULE

FIELD OF THE INVENTION

The present invention relates generally to the field of computing. More particularly, the invention provides systems and methods for enhancing computer security by preventing unauthorized modifications of data used during boot, and preventing post-boot access to resources needed only during boot.

BACKGROUND OF THE INVENTION

Security has become a widespread concern for computer users. Viruses, worms, Trojan horses, identity theft, software and media content piracy, and extortion using threats of data destruction are rampant. An operating system can provide numerous security features to guard against such attacks. However, the security features of an operating system are ineffective if they are disabled. Disabling such security features, if it is attempted, will likely be attempted during the boot of the operating system. After boot, an operating system may have numerous features in place for protecting itself and the data and processes which it manages. During boot, however, those features may not yet be initialized and are vulnerable to bypass and/or tampering.

Exemplary security features presently used by operating systems are the Encrypted File System (EFS), and the Trusted Platform Module (TPM). The EFS feature encrypts selected sensitive data. An operating system does not need to access EFS data until a user is logged on. After operating system boot, a user may provide a password to a logon process. The password grants access to a decryption key that can decrypt the EFS data. By way of example, the MICROSOFT WINDOWS® operating systems employ a system key, or "SYSKEY," that is used to protect various processes by making the correct performance of those processes dependent on the availability of SYSKEY. For example, the key needed to decrypt EFS data that is stored by the operating system in encrypted form may be derivable from the SYSKEY.

The key(s) needed to perform restricted operations are thus protected by the logon procedure. Typically, the user must correctly authenticate himself prior to commencing use of the system. Use of the keys is enabled only if the user correctly authenticates. However, using the logon procedure to protect access to keys assumes that the operating system loaded the correct logon program, and that the use of the keys has not been otherwise enabled by rogue code that may be running. If a rogue operating system loader was used during boot instead of the correct operating system loader, the rogue loader may cause a rogue logon program to be loaded with the operating system. The rogue logon program may in turn enable the use of EFS keys without entry of the proper password. Since the loading of the operating system provides an opportunity for a security breach, protection of the keys in such a situation requires that the loading of the operating system take place under circumstances where it can be verified to take place correctly.

Because EFS is a feature supported by a booted operating system it is likewise ineffective at protecting certain data that is divulged during a boot process. EFS cannot protect user data that is required before the user is logged on, such as the secrets required for some system services; databases used by network services (e.g. personal or public web server); and RAS credentials for connecting to a company domain.

A Trusted Processing Module (TPM) ensures trustworthiness of software that is run on a computer. This is accomplished, in general, by submitting trusted measurements of data to the TPM, and relying on the TPM to determine if the measurement is what it should be. Computer security is often dependent on being able to predict the behavior of software components. In general, the security of a system may flow from the premise that a known program whose behavior is understood, which proceeds from a known good state, will act in a predictable manner. Conversely, the thwarting of security—which may involve getting a computer system to behave in ways that are outside the contemplation of its designer—can generally be realized by replacing or changing a known program, or running it in a state in which its behavior is not understood. Thus, one aspect of providing security for a computing environment includes verifying that a known program is being used, and that it is proceeding from a known good state. The TPM accomplishes this by validating that data is what it should be because a measurement such as a hash of the data matches a value previously sealed in the TPM.

Like EFS, the TPM has been successfully employed to provide a degree of assurance as to the integrity of applications running on a booted computer. A number of additional limitations also exist for the TPM. For example, a machine using the TPM in a standard way cannot be reconfigured in the field (for example, inserting a network card into a laptop whilst at a conference). The TPM creates severe limitations and complexities for an initialized operating system.

Most TPMs today conform to the TRUSTED COMPUTING GROUPS® (TCG) standard, presently available at https://www.trustedcomputinggroup.org/home and entitled "Trusted Platform Module (TPM) Specification Version 1.2." The TPM is a subsystem that may be incorporated into computing platforms to establish trust for the code that is executed by a platform. Standardization of mechanisms for establishing trustworthy code is beneficial because it allows the security and cryptographic community to assess the mechanisms for providing security, and because it promotes customer understanding and trust of new software features. It also encourages innovation in implementing and improving the standard, as contemplated and encouraged by the TCG®. As stated in the TCG® specification, "[m]anufacturers will compete in the marketplace by installing subsystems with varying capabilities and cost points."

The above exemplary security mechanisms employed by operating systems are supplemented by some techniques for securing boot. Machine password authentication can be used to protect secrets using a machine global password. This however requires a password to be entered before a machine boots. The password must be shared by multiple users of a machine, which is a first security flaw. A second flaw is that usability issues are introduced, because a typical user interface cannot be presented for the password input. This is particularly cumbersome for a tablet PC. Often the machine global password may be written on a piece of paper and left in the presence of the machine. Thus, the password is effective but does not allow sophisticated user protection of the type that is frequently desired.

Secondly, a secret may be stored on removable media. Again, this feature is effective in theory from a security standpoint, however in practice it is often problematic. The fundamental issue in this case is that to ensure a usable functioning system, the removable media will almost always be left inside the machine.

In the absence of adequate assurances of a secure operating system boot, the ability of a user to protect the data on a computer is limited by the security of the building that such a computer is locked in, rather than the security functions of the operating system running on the computer. With the popularity of laptops, and the rising increase of computer thefts, in particular, laptop thefts, a solution is desirable that allows the security of an operating system to remain uncompromised when the computer enters into the hands of a thief.

Systems and methods for using a TPM to secure a boot process remain largely unexplored. In addition to the use of a TPM in a boot process, systems and methods for performing maintenance of boot processes and for controlling access to data on such a computer may prove useful. Description of such systems and methods can be found in a patent entitled "Systems and Methods for Boot Recovery in a Secure Boot Process on a Computer with a Hardware Security Module,", U.S. patent application Ser. No. 11/035,715, filed Jan. 14, 2005, a patent entitled "Systems and Methods for Updating a Secure Boot Process on a Computer with a Hardware Security Module," U.S. patent application Ser. No. 11/036,018, filed Jan. 14, 2005, and a patent entitled "Systems and Methods for Controlling Access to Data on a Computer with a Secure Boot Process," U.S. patent application Ser. No. 11/036,415, filed Jan. 14, 2005. Also generally related to this invention is U.S. patent application Ser. No. 10/882,134, filed Jun. 30, 2004, entitled "System and method for protected operating system boot using state validation."

SUMMARY OF THE INVENTION

In consideration of the above, the present invention provides systems and methods for securely booting a computer with a trusted platform module (TPM) for validating integrity metrics of software components. A TPM for use with the invention may seal secrets to a plurality of platform configuration register (PCR) values. The PCR values may be obtained by measuring boot components. If the boot components are unmodified from the time the secrets were sealed, then the secrets can be obtained for proper system boot. An expected hash value of a boot component may be placed into a PCR, which unseals a secret if the expected value is correct. The secret may then be used to decrypt the actual boot component from its location on disk. The hash of the decrypted boot component may then be calculated and the result can be compared to the expected value. Another example entails the use of two secrets that may be sealed to PCR values obtainable at different points in a boot process. A first secret may be accessible only when a first plurality of PCR values are loaded, while a second secret is accessible only after one or more of the first plurality of values has been replaced with a new value, thereby necessarily revoking further access to the first secret in order to grant access to the second secret. Other advantages and features of the invention are described below.

BRIEF DESCRIPTION OF THE DRAWINGS

The systems and methods for securely booting a computer in accordance with the present invention are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked computing environment is illustrated in FIG. 2 as an extension of the basic computing environment, to emphasize that modern computing techniques can be performed across multiple discrete devices.

Figure 3:
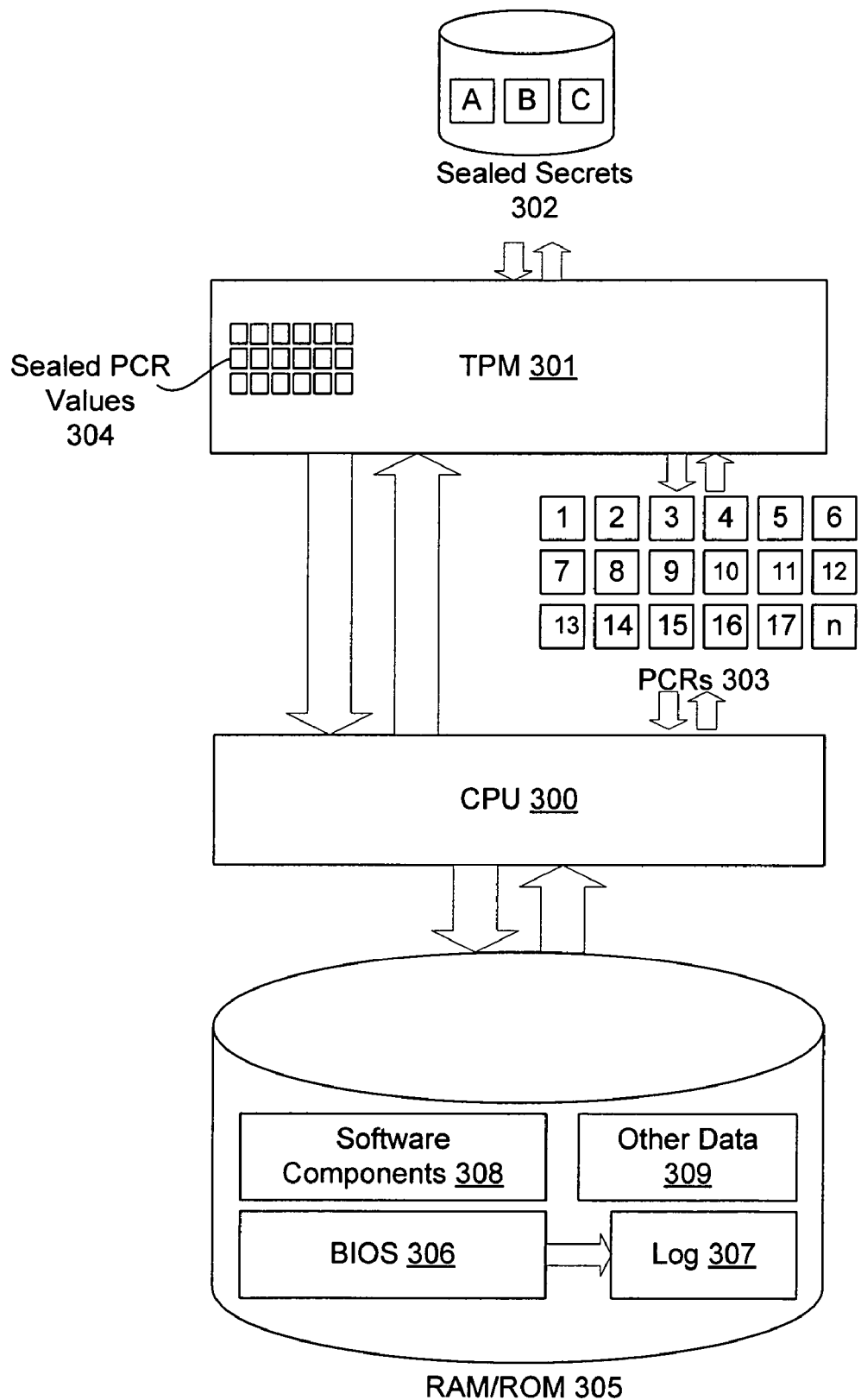
FIG. 3 illustrates a computing platform that makes use of a Trusted Platform Module (TPM).

Next, a summary of a computing platform that makes use of a hardware security module (HSM) is provided, in connection with FIG. 3, to explain how measurements may be submitted to an HSM, which can be configured to return keys to system resources if those measurements are correct. Note that the HSM illustrated in FIG. 3 is a TPM, which is an HSM that is readily recognized by those of skill in the art. Also, further processing of software components involved in boot or thereafter can be made contingent on unsealing a secret protected by a TPM. The use of a TPM by software components in a boot process is then illustrated in FIG. 4. FIG. 5 shows one general pattern for use of the TPM by the software components such as those of FIG. 4, in which the loading and execution of a next software component is contingent on the verification of a hash of the next component's executable code.

Figure 5:
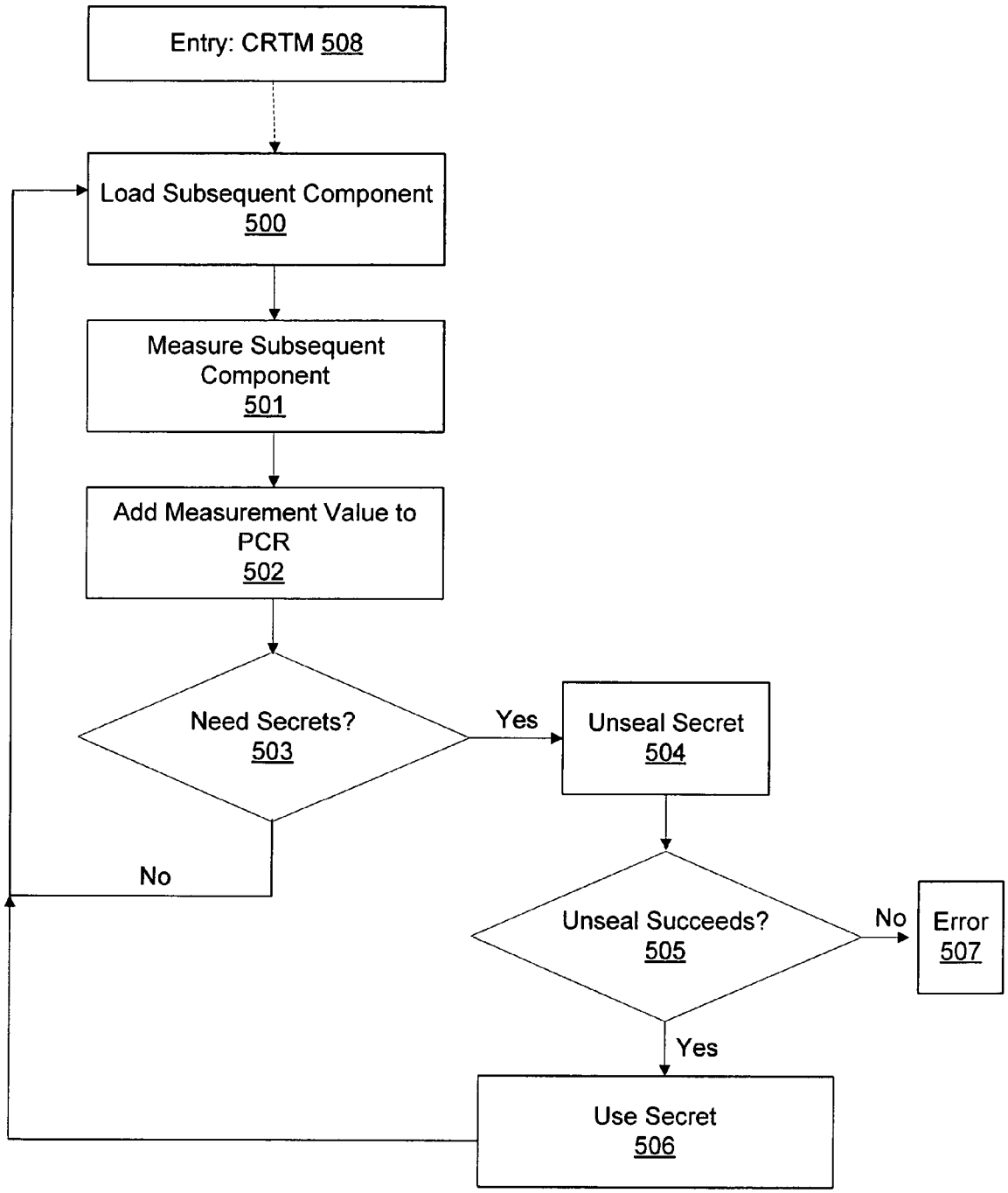
FIG. 5 illustrates a general technique for using a hardware security module (HSM), such at a TPM, ensure the integrity of a subsequent software component or process prior to allowing that subsequent component to execute.
Figure 5A:
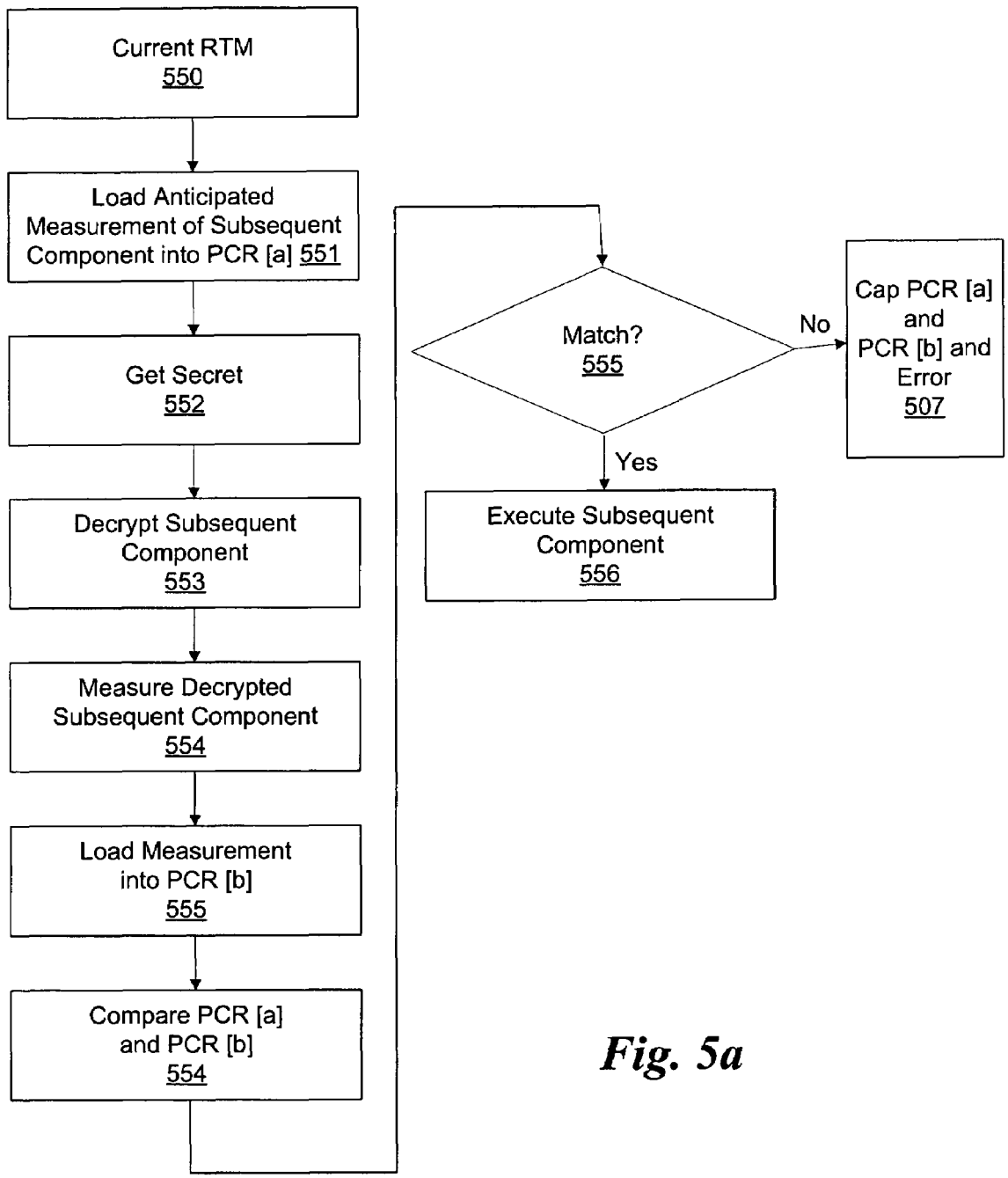
FIG. 5a illustrates a system and method for ensuring that a boot process cannot proceed unless a measurements of data used in the process are validated by a TPM.
Figure 6:
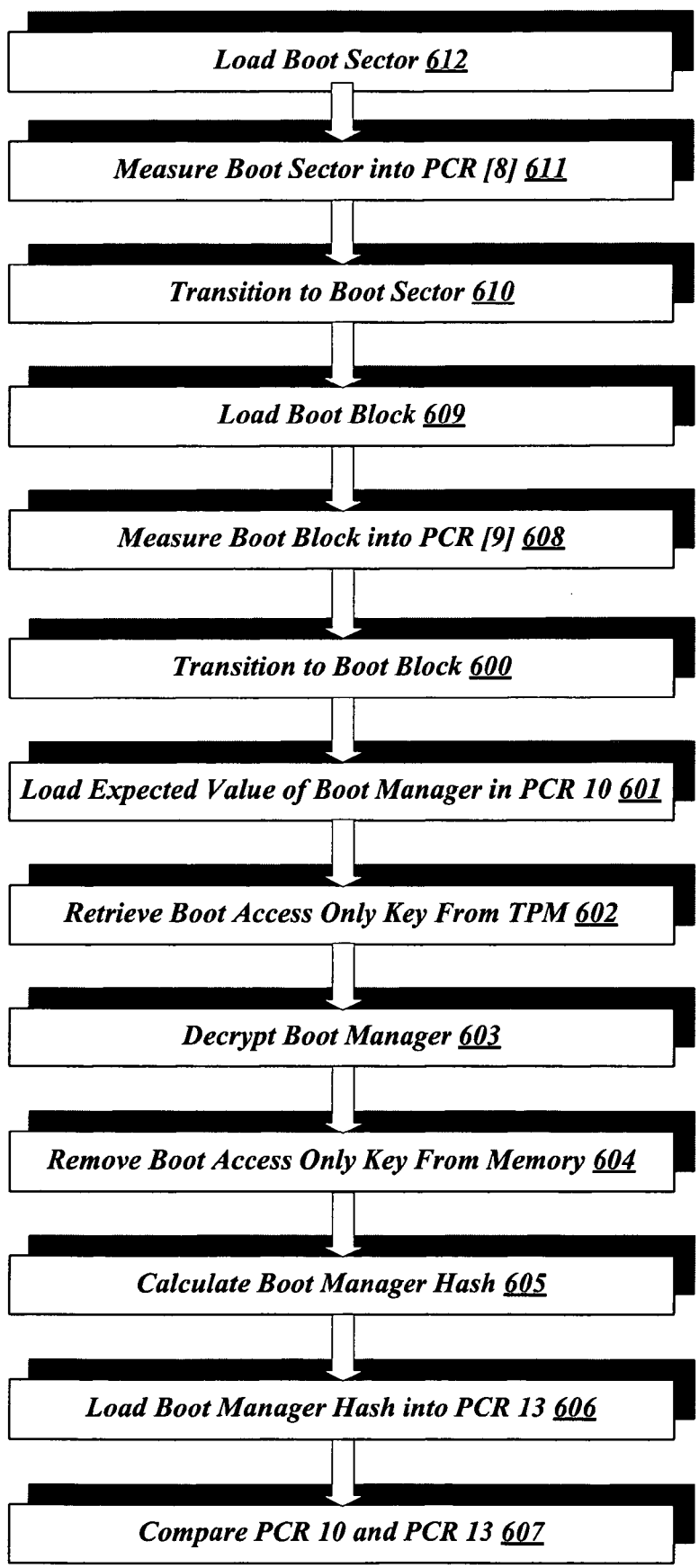
FIG. 6 demonstrates an example of the systems and methods illustrated in FIG. 5a wherein successful boot of a computer is tied to the successful decryption and measurement of an exemplary component, the boot manager.
Figure 7:
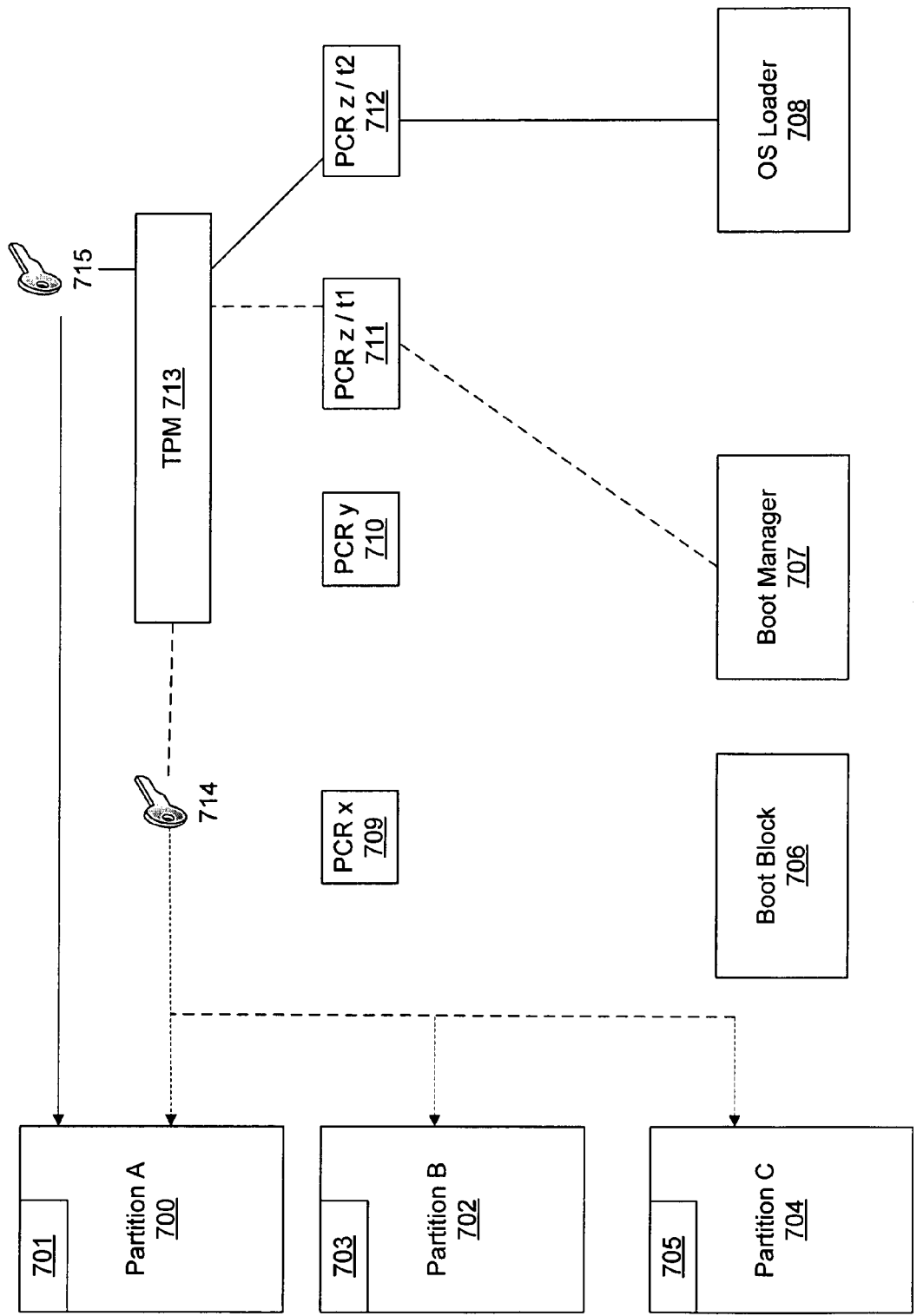
FIG. 7 diagrams the operation of an architecture for providing boot components with access to resources for a limited duration, and then revoking access to the resources prior to launching an operating system.
Figure 8:
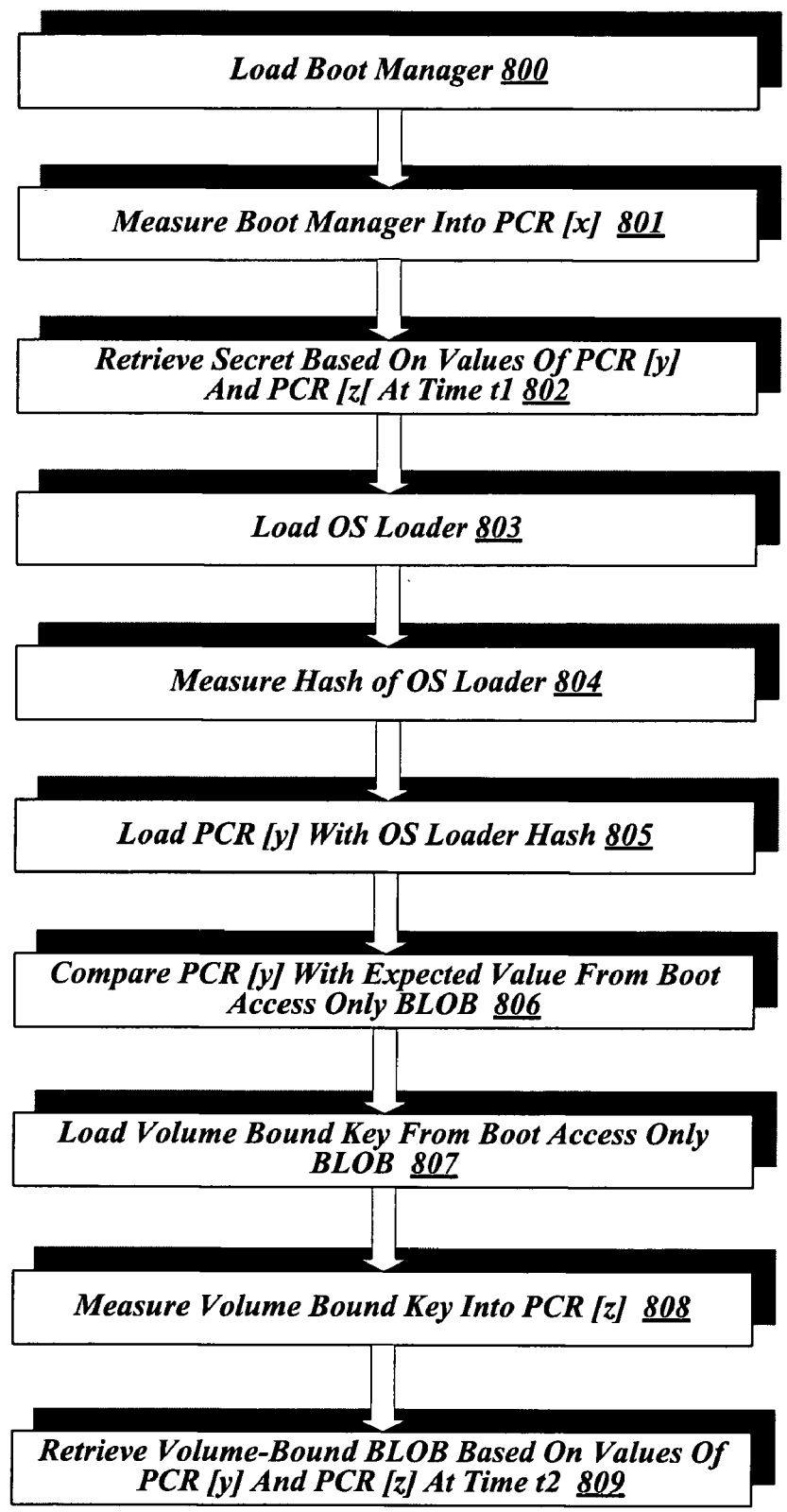
FIG. 8 provides a flowchart for exemplary steps to be carried out in an architecture such as FIG. 7.

In FIGS. 5a, 6, 7, and 8, aspects of the use of the TPM registers, referred to as platform configuration registers (PCRs) in a boot process are explained in greater detail. FIG. 5a illustrates a system and method for ensuring that a boot process cannot proceed unless a particular set of boot components are in place. FIG. 6 demonstrates an example of the systems and methods illustrated in FIG. 5a wherein successful boot of a computer is tied to the successful decryption and measurement of an exemplary component, the boot manager. FIGS. 7 and 8 illustrate a mechanism for preventing access to system resources needed for boot after the boot process has successfully launched an operating system and those resources (typically residing on one or more disk partitions) are no longer needed.

Exemplary Computing and Networked Environments

Figure 1:
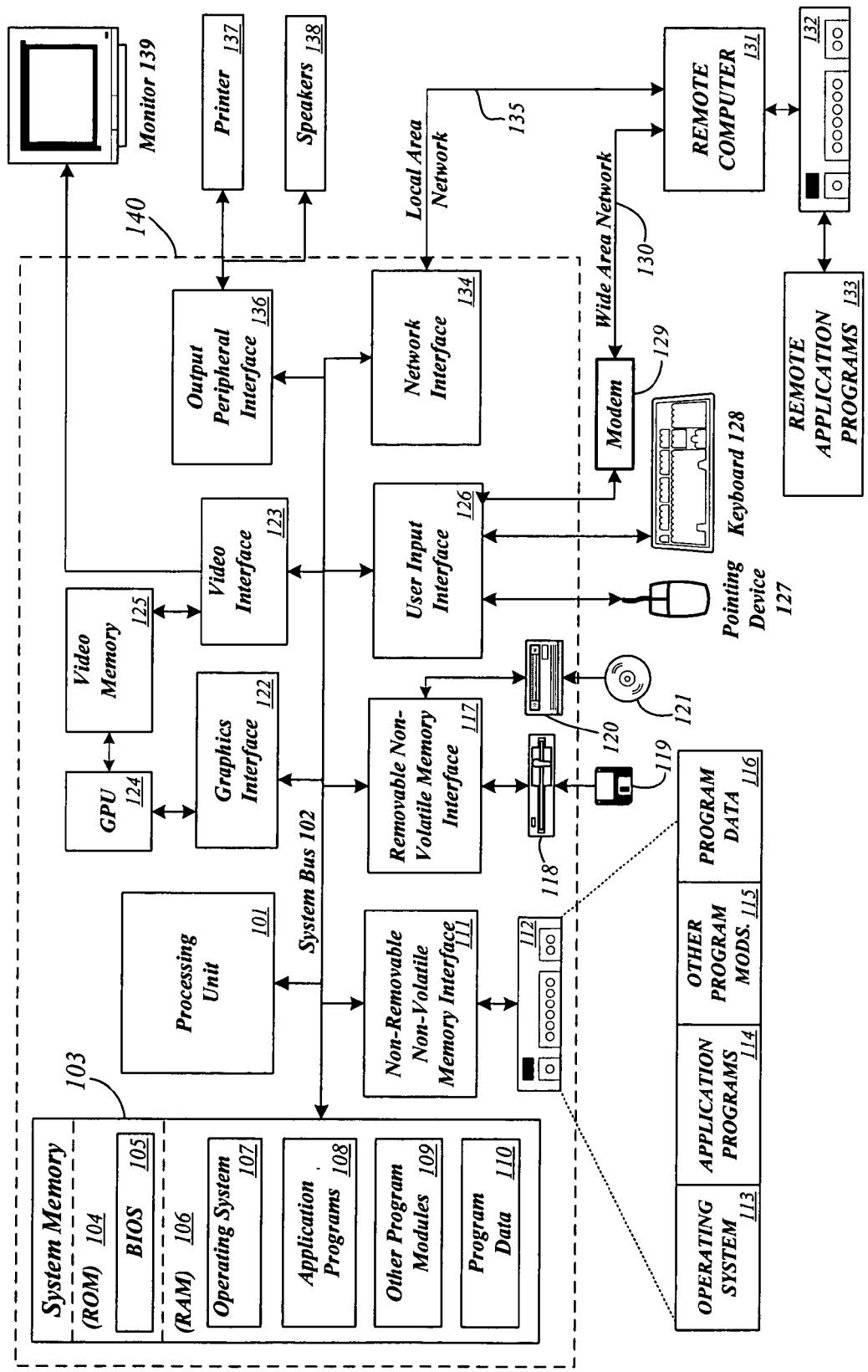
FIG. 1 sets forth a computing environment that is suitable to implement the software and/or hardware techniques associated with the invention.
Figure 2:
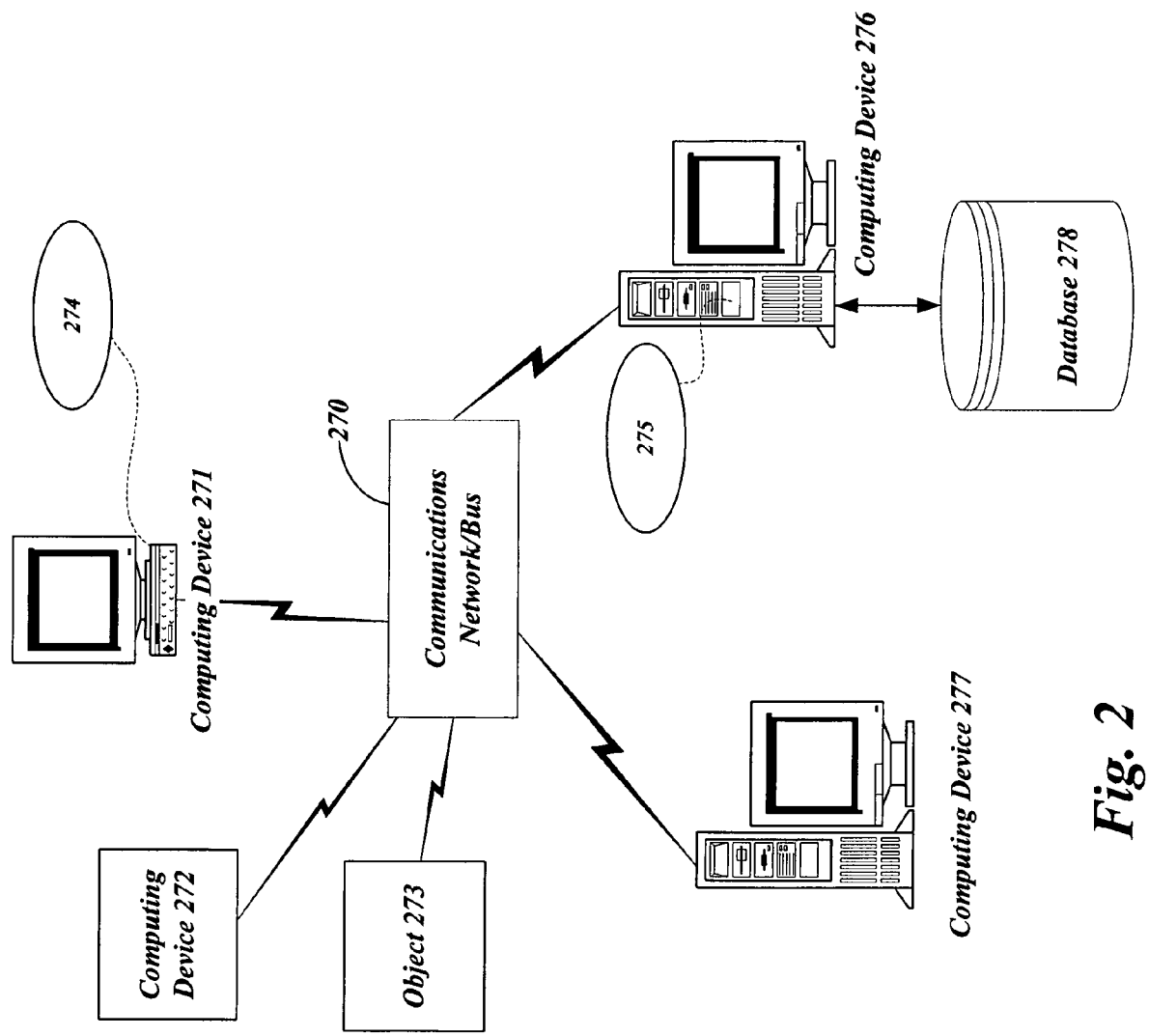
FIG. 2 provides an extension of the basic computing environment from FIG. 1, to emphasize that modern computing techniques can be performed across multiple networked devices.

The computing system environment 100 in FIG. 1 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be implemented in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 121. Components of computer 121 may include, but are not limited to, a processing unit 101, a system memory 103, and a system bus 102 that couples various system components including the system memory to the processing unit 101. The system bus 102 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

An HSM is not shown in FIG. 1, though such a device may be a part of computers that implement the invention. FIG. 3 shows an HSM (a TPM in the embodiments of FIG. 3) that is integrated with components of a computer, as will be discussed with reference to FIG. 3 below. In a classic embodiment, an HSM may be a hardware chip that is welded to the motherboard, or integrated into a chipset or other hardware component of a computer such as that of FIG. 1 for the purpose of providing a range of security functions. However, for the purpose of this specification, it should be understood that a HSM can be implemented in hardware or software, and is defined broadly as a functional unit that can provide those trusted functions that are needed for operation of the invention, i.e. comparison and verification of measurements submitted to it, and release of keys for access to encrypted memory resources. The TPM may also provide a range of other functions, as described in the TCG® specifications for an industry standard TPM.

Computer 121 typically includes a variety of computer readable media. Computer readable media can be any available media that can be accessed by computer 121 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 121. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 103 includes computer storage media in the form of volatile and/or nonvolatile memory such as read only memory (ROM) 104 and random access memory (RAM) 106. A basic input/output system 105 (BIOS), containing the basic routines that help to transfer information between elements within computer 121, such as during start-up, is typically stored in ROM 104. RAM 106 typically contains data and/or program modules that are immediately accessible to and/or presently being operated on by processing unit 101. By way of example, and not limitation, FIG. 1 illustrates operating system 107, application programs 108, other program modules 109, and program data 110.

The computer 121 may also include other removable/non-removable, volatile/nonvolatile computer storage media. By way of example only, FIG. 1 illustrates a hard disk drive 112 that reads from or writes to non-removable, nonvolatile magnetic media, a magnetic disk drive 118 that reads from or writes to a removable, nonvolatile magnetic disk 119, and an optical disk drive 120 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 112 is typically connected to the system bus 102 through an non-removable memory interface such as interface 111, and magnetic disk drive 118 and optical disk drive 120 are typically connected to the system bus 102 by a removable memory interface, such as interface 117.

The drives and their associated computer storage media discussed above and illustrated in FIG. 1, provide storage of computer readable instructions, data structures, program modules and other data for the computer 121. In FIG. 1, for example, hard disk drive 112 is illustrated as storing operating system 113, application programs 114, other program modules 115, and program data 116. Note that these components can either be the same as or different from operating system 107, application programs 108, other program modules 109, and program data 110. Operating system 113, application programs 114, other program modules 115, and program data 116 are given different numbers here to illustrate that, at a minimum, they are different copies. A user may enter commands and information into the computer 121 through input devices such as a keyboard 128 and pointing device 127, commonly referred to as a mouse, trackball or touch pad. Other input devices (not shown) may include a microphone, joystick, game pad, satellite dish, scanner, or the like. These and other input devices are often connected to the processing unit 101 through a user input interface 126 that is coupled to the system bus, but may be connected by other interface and bus structures, such as a parallel port, game port or a universal serial bus (USB). A monitor 139 or other type of display device is also connected to the system bus 102 via an interface, such as a video interface 232. In addition to the monitor, computers may also include other peripheral output devices such as speakers 138 and printer 137, which may be connected through an output peripheral interface 123.

The computer 121 may operate in a networked environment using logical connections to one or more remote computers, such as a remote computer 131. The remote computer 131 may be a personal computer, a server, a router, a network PC, a peer device or other common network node, and typically includes many or all of the elements described above relative to the computer 121, although only a memory storage device 132 has been illustrated in FIG. 1. The logical connections depicted in FIG. 1 include a local area network (LAN) 135 and a wide area network (WAN) 130, but may also include other networks. Such networking environments are commonplace in offices, enterprise-wide computer networks, intranets and the Internet.

When used in a LAN networking environment, the computer 121 is connected to the LAN 135 through a network interface or adapter 134. When used in a WAN networking environment, the computer 121 typically includes a modem 129 or other means for establishing communications over the WAN 130, such as the Internet. The modem 129, which may be internal or external, may be connected to the system bus 102 via the user input interface 126, or other appropriate mechanism. In a networked environment, program modules depicted relative to the computer 121, or portions thereof, may be stored in the remote memory storage device. By way of example, and not limitation, FIG. 1 illustrates remote application programs 133 as residing on memory device 132. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

An exemplary networked computing environment is provided in FIG. 2. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework of FIG. 1, and the further diversification that can occur in computing in a network environment such as that of FIG. 2, the systems and methods provided herein cannot be construed as limited in any way to a particular computing architecture. Instead, the present invention should not be limited to any single embodiment, but rather should be construed in breadth and scope in accordance with the appended claims.

Exemplary TPM Secured Boot Sequence

Embodiments of the invention utilize a TPM in a secure boot process. A TPM is illustrated in the context of a computer architecture in FIG. 3. While the TPM contemplated for use in embodiments of the invention may be TCG® 1.2 compliant, any HSM for validating measurements, such as those placed in PCRs, and unsealing secrets if the measurements are correct may be used.

In this regard, FIG. 3 presents a CPU 300 with access to memory 305, in a highly generalized view of a computer such as that of FIG. 1. The CPU 300 may rely on a TPM 301 for certain security functions. In general, the CPU 300 may first perform measurements of data involved in a boot process, and those measurements may be securely stored in the TPM 301, as illustrated by the sealed PCR values 304. Note that in various embodiments the various PCR values 304 and 303 illustrated in the figures herein my in fact be stored in one or more single storage locations that are extended by an algebraic formula, as defined in the TCG® 1.2 specification.

Secrets 302 may be sealed to the particular PCR values 304 in the TPM 301. To retrieve the secrets 302 from the TPM 301, correct PCR values must be entered into PCRs 303. These correct values may be obtained by measuring the same data that was measured to obtain PCR values 304 sealed in the TPM 301. Multiple secrets 302 may be sealed to a variety of PCRs 304. For example, to retrieve a first secret A, it may be required that a correct value be stored in PCR [1], PCR [2] and PCR [3]. To obtain a second secret B, a fourth correct value may be required in PCR [4].

If a measurement is placed in a PCR 303 that does not match a value for that measurement sealed in the TPM 301, then when the TPM 301 is requested to unseal a secret 302, the unseal will fail. If correct measurements are placed in PCRs 303, then the TPM 301 can be trusted to unseal secrets 302 when requested to do so. Therefore, a "correct" measurement, or correct value, for purposes of this application, is a measurement to which a secret 302 is sealed, and thereby permits unsealing of the secret 302 by the TPM 301. Note that a correct measurement could be, in some embodiments, a measurement of malicious code. This is the case, for example, when the initial measurements 304 sealed in the TPM 301 are corrupt.

The secrets sealed to particular measurements may be any data. Typically, secrets 302 will take the form of decryption keys and/or Binary Large Objects (BLOBS). In general, a key provides information that can be used to decrypt data. A sealed BLOB may contain a key as well as other data that may be useful. In this regard, equivalents for various techniques discussed herein may be constructed by substituting keys for BLOBS and vice versa, as will be appreciated by those of skill in the art. Thus, if a CPU 300 submits correct measurements to PCRs in 303, then when a corresponding secret 302 such as a key is requested, the TPM 301 can unseal the secret 302. The key from 302 may then be used to decrypt portions of memory 305 accessible by the CPU 300. In embodiments of the invention, a TPM 301 may be configured to grant access to three secrets, A, B, and C, as shown in FIG. 3. The secrets 302 may be sealed to various required PCR values, and therefore may be accessible only after certain measurements are performed. These three keys, or three secrets, will be referred to here as, first, a boot access only secret, second, a volume-bound secret, and third, a password secret.

TPM related activity may be stored in a log 307. The log 307 may be maintained by the computer's BIOS in some embodiments. Any other process may also be responsible for maintaining a log 307. Thus, if data such as a software component 308 or other data 309 is measured into a PCR 303, the data that was measured may be identified in the log 307. If a secret unseal request is made, the request event may be identified in the log 307. These are but two examples of storing TPM related activity in a log 307, which may contain records for a wide range of other events and activities.

Typically, a TPM 301 operates in conjunction with a Static Root of Trust Measurement (SRTM) for performing trusted measurements and submitting them to a TPM 301. However, other processes for making secure measurements, such as through the use of a DRTM Nexus are available. Embodiments of the invention may use a trusted measurement process such as an SRTM in this manner, and in this regard the SRTM may be a BIOS standard SRTM used by the various software components (also called processes and RTMs) discussed herein to measure initial disk based boot code. The system may also extend the SRTM to measure other code and critical data involved in the early stages of booting an operating system so that any early stage of operating system boot can be measured. Note that PCRs 303 may contain values obtained from anywhere. The values may be measurements of data such as software components 308 or other data 309. The invention is not limited to any exclusive combination of data measurements or other values that are placed in PCRs 303.

Figure 4:
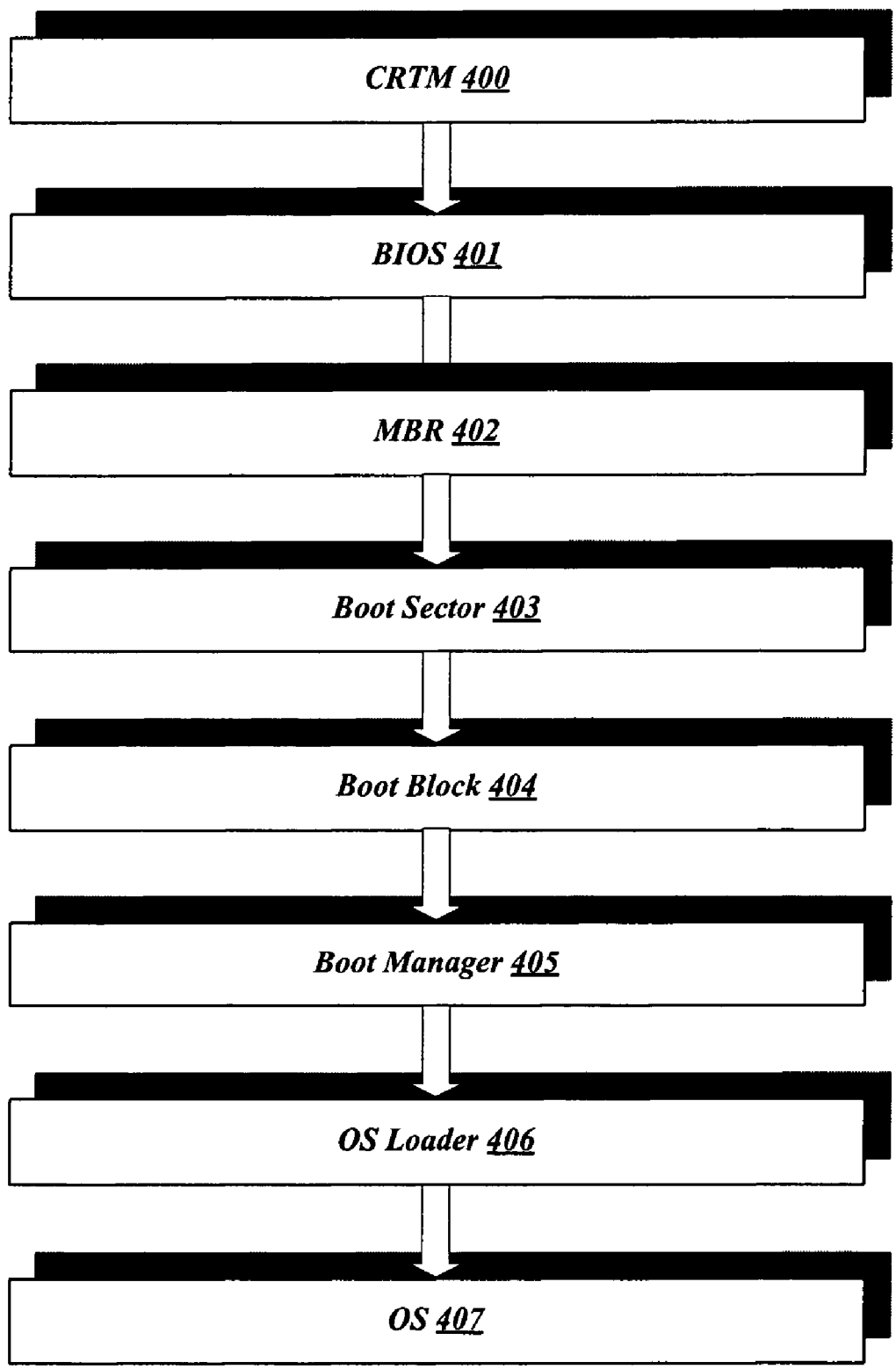
FIG. 4 illustrates an exemplary boot process wherein a plurality of software components measure a subsequent process prior to transitioning to the subsequent process.

In a TPM secured boot process, the arrangement displayed in FIG. 3 may be used to measure the exemplary software components illustrated in FIG. 4, and store the measurements in the PCRs 303. The boot components illustrated in FIG. 4, which may be chosen to be measured by embodiments of the invention, and particularly disk based code components, are known to change rarely, and are subject to an easy attack. Therefore enforcing that certain boot components remain unchanged, unless by qualified maintenance and update processes as described herein, is a relatively small price to pay to significantly enhance data security.

Referring to FIG. 4, a series of software components 400-407 is illustrated to provide an exemplary boot process for a computer. The invention is not limited to the particular components shown, nor to the sequence of components. The illustrated components may be sequentially loaded, starting with the Core Root of Trust for Measurement (CRTM) 400, and ending with the components of an Operating System (OS) 407, which is generalized here as a single software component 407. Loading a component entails giving the component access to the resources of a computer, such as memory and the CPU, so that the instructions of the component can be executed by the CPU. If a component in FIG. 4 is malicious or corrupt, it can be used to circumvent security measures once it is loaded. Thus, a process for booting a computer in conformance with the invention comprises measuring a component or plurality of components into one or more PCRs 303 prior to allowing the component(s) to execute. Successful boot may be made contingent on secrets 302 sealed to a trusted set of measurements 304 that are sealed in the TPM. Note, however, that the invention may also seal measurements of malicious code in a TPM. If malicious code is running at the time of seal, then those measurements may be needed for boot. Ideally, the secrets are sealed to measurements 304 of trusted code. If the measurements placed in PCRs 303 are correct, then secrets from 302 may be unsealed, allowing a machine to proceed with secure boot. The process of unsealing a secret 302 is illustrated in FIG. 5.

In some usage scenarios, the owner of a machine may determine that they wish to "lock" the configuration of the machine, ensuring no ROM-based code in addition to that previously validated is ever executed. In this case, the machine owner may configure more software components to be involved in the validation process (BIOS, option ROMs) by selecting additional PCRs 302 to be used. The owner may also determine they wish to additionally utilize a machine password that is validated by the TPM 301. This allows the security to be extended above what may be typically provided in standard embodiments of the invention, and allows a user to weigh machine security against ease of use.

FIG. 5 illustrates a technique for using a TPM ensure the integrity of a subsequent software component prior loading that subsequent component. The steps of FIG. 5 may be carried out by placing appropriate instructions in a series of components, such as the components of FIG. 4. In this regard, the process of FIG. 5 may begin with the execution of a CRTM component 508. A component, such at the CRTM and some or all of the other components of FIG. 4 may bear instructions for measuring another component and placing the result in a PCR, such as from 303 in FIG. 3. A component bearing such instructions is sometimes referred to as a Root of Trust for Measurement (RTM), and may contain instructions for utilizing an SRTM as mentioned above. Thus, if the boot block measures the boot manager, the boot block serves as an RTM for the boot manager.

An RTM can load a subsequent component into memory 500, and then perform a measurement on a subsequent component 501, and add the measurement to a PCR 502. If the RTM needs a secret, such as a key or a BLOB from the TPM 503, then it may request such secrets, and the TPM will release the requested secret(s) only if correct PCR values are loaded for all PCRs needed to access the secret. Thus, an attempt may be made to unseal a secret based on information retrieved from the TPM 504. If the unseal succeeds in step 505, additional steps may be taken, which may comprise loading a subsequent component, as well as other actions described below. If the unseal does not succeed, the values in the PCRs were likely incorrect and thus the executing code may be corrupt. An error may result in step 507 and appropriate measures can be taken to ensure that no access is provided to the sensitive information stored on the computer, for example, by using encryption of the data on the computer's disk and refraining from giving out the decryption key. Alternatively, processes for maintaining the system for example by restoring it to a state which will produce correct PCR values, or by authenticating a user to authorize new sealed PCR values—in values 302 from FIG. 3—may be implemented. Such processes are explained below. If no secrets are needed in step 503, a subsequent component can be loaded without requesting any secrets, as shown.

FIG. 4 and FIG. 5 may be referred to together to illustrate exemplary boot processes conforming to the systems and methods of the invention. A CRTM 400 can be loaded first, which loads and measures a Basic Input/Output System (BIOS) 401. This measurement can be made, for example, by performing a hash over the BIOS, and then submitting the hash measurement value to a PCR. The BIOS may then be allowed to execute, and may serve as an RTM for the Master Boot Record (MBR) 402. The MBR can be measured into a PCR, then the MBR 402 may be allowed to execute. The MBR may measure a boot sector component 403, which is then allowed to execute. This pattern of loading, measuring, writing to a PCR, and then transitioning to a subsequent component can be repeated by each component 404, 405, 406, and 407, as well as any components in the operating system 407 as necessary. Additional aspects of the invention include variations of this process, which may request and use secrets at any point along the way, as such requests are illustrated in FIG. 5. In this regard, embodiments of the invention provide heightened security through additional steps that may be performed prior to transitioning to a subsequent component. These additional steps may make the successful boot of a machine contingent on secrets that are obtained by measuring correct PCR values, thereby ensuring that some or all of the data used in boot is as it was when the secrets were sealed. The additional steps may also operate to prevent post-boot access to resources that are needed during boot but not thereafter.

The basic process of FIG. 4 and FIG. 5 can be enhanced by requiring some of the components 400-406 to retrieve secrets, which may be decryption keys, BLOBS, or other guarded information that allows access to decryption keys and the like prior to transitioning to a subsequent component. Embodiments of the invention may thus condition the performance of useful operations by an operating system on access to one or more secrets at strategic points in a boot process. If it is discovered that any of the code modules 401-406 (also referred to here as components and/or software processes) that are measured were changed, then crucial secrets can be withheld. Examples of secrets that may be withheld are the "SYSKEY" (used by LSASS to encrypt local secrets such as passwords used by services), a volume-encryption key for decrypting substantially everything stored on a computer's hard drive or disk partition, and secrets required by a higher level of system protection such as EFS. The higher level protections can then perform validation using catalogs in a manner that is much more versatile than SRTM.

To repair the machine to a state from which it can successfully boot, the systems and methods described below may be implemented in addition to the secure boot processes described herein.

Exemplary Additional Boot Protection Techniques

In a boot sequence such as that which may be understood with reference to FIGS. 4 and 5, wherein a plurality of software components may be configured to measure a next component prior to transitioning to the next component, some additional precautions may be taken that further enhance the security of the data stored on a computer. These additional precautions are the subject of this section. Any or all of the precautions explained here may be incorporated into embodiments of the invention. In one preferred embodiment, all of the precautions explained here are used, as will be explained below. However the invention is not limited to such implementations.

With reference first to FIG. 5a, the boot of a computer may be tied to integrity of the components that precede the operating system by conditioning the release of a secret on such platform integrity. A conceptual overview of FIG. 5a is provided first, and then a more detailed description of FIG. 5a is provided.

First, a PCR can extended with the publicly known hash of a software component such as the boot manager. This results in a boot secret being unsealable, which is satisfactory if all preceding software components are trusted. All preceding components can be trusted boot secret can be unsealed. At this juncture, the status of the software component, e.g. the boot manager, us unknown.

Next, the boot secret can be decrypted and a volume symmetric key can be used to decrypt a system partition on the fly to read the boot manager into memory Third, the pre-authentication step can be consolidated by verifying the hash of the boot manager which is now decrypted and in memory against the well known hash. If the hashes match, boot may proceed normally. If the hash is incorrect, the PCRs may be invalidated. There are at least the following ways of checking that the hash is correct:

a. Check the hash of the boot manager against the publicly known hash. We know the publicly known hash is valid if the system was able to unseal the boot secret, so by implication we know the hash of the boot manager is valid if it matches the hash used to unseal the boot blob.

b. Check the hash of the boot manager against a hash stored in the sealed secret.

c. Extend a different PCR with the publicly known hash of the boot manager and compare the two hashes.

Referring now to FIG. 5a in greater detail, a current component, or RTM, is executing in step 550. The current RTM may perform the following steps in order to transition to a next software component. An anticipated measurement of a subsequent component may be loaded into a PCR, e.g. PCR [a] 551. The RTM component may then attempt to retrieve a secret 552. If PCR [a] was not loaded with a correct value, then the current RTM may not be valid, and access to the secret may be denied, thereby blocking normal boot as explained with reference to FIG. 5. The secret may be used to decrypt a subsequent component 553. Because the subsequent component is decrypted, it is impossible for would-be attackers to reverse engineer and modify the subsequent component to perform in unexpected ways. The decrypted subsequent component can be measured 554 and the measurement can be placed in a PCR such as PCR [b] 555. The RTM may next compare the values of PCR [a] and [b]. If they match, the RTM may transition to a next component, which may be the subsequent component 556. If they do not match, PCR [a] and [b] can be capped at a terminal value, for example by measuring some predetermined portion of memory into those PCRs, and normal boot can be aborted 557.

With regard to FIG. 6, the illustrated flowchart shows an embodiment of the systems and methods introduced in FIG. 5a, whereby a number of steps that implement systems and methods for conditioning access to a critical boot component on the successful operation of preceding components as well as the integrity of the critical boot component. The exemplary boot component used in FIG. 6 is the boot manager, although any component may be the subject of the technique demonstrated in FIG. 6. For the purpose of this explanation, the steps of FIG. 6 may be understood in the context of FIG. 4. A plurality of software components may be executing in a serial manner, and one or more of them may be measuring a next component prior to transitioning to the next component.

In this context, a first component, such as the boot sector, may be loaded at some point in the boot process, as illustrated in step 612. The boot sector may then be measured into a PCR, in accordance with the techniques set forth in FIG. 5a. The exemplary PCR used in step 611 is PCR [8], although the invention is not limited to any particular PCR. The computer may then transition to execution of the boot sector 612. Now the boot sector may serve as an RTM for the boot block, and in this regard may measure the boot block into PCR [9] 608. The computer may then transition to execution of the boot block 600. Now the boot block may serve as an RTM for the boot manager, as well as perform the additional security measures in the following steps.

Thus, the boot block may load an expected measurement value of the boot manager into a PCR 601. The exemplary PCR used in FIG. 6 is PCR 10. If the values loaded into PCR [8], [9], and [10], as well as any previous or subsequent PCRs that are configured to control are correct, the TPM may grant access to a secret when such secret is requested by the boot block. The secret may be a decryption key, for decrypting a portion of memory, such as a portion of a hard disk, where the boot manager is stored. This key may be retrieved by the boot block component as illustrated in step 602. Note that requiring the boot block to produce a correct expected measurement for the boot manager provides a first layer of security: if an incorrect value is provided, the TPM may deny access to the key needed to decrypt the boot manager.

When the correct expected value is provided, an encryption key may be retrieved which may then be used to decrypt the boot manager component in step 603. The boot block may then be configured to permanently dispose of the "boot access only" key used to decrypt the boot manager 604. By disposing of the boot access only key prior to loading the boot manager, a layer of security is added, because if the boot manager or a subsequently loaded component is corrupt, it will not have access to the key and therefore it will be severely restricted in the data that it may access. This is especially true when the computer's hard disk is almost entirely encrypted, as contemplated for various embodiments of the invention.

Next, a measurement may be taken of the boot manager component, such as a calculation of the component's hash value 605. The measurement may be stored in another PCR, such as PCR 13 606. The values stored in PCR 10 and PCR 13 may be compared to determine if they match, as shown in step 607. If they do not match, it can be concluded that the boot manager has changed and may contain corrupt or malicious code. Remember that the transition to execution of the boot manager component has not yet been made, and therefore it cannot yet do any harm. If the boot manager is corrupt, appropriate security measures may be taken by the boot block. Thus, the boot of the computer may be made contingent upon the successful decryption and measurement of a critical software component such as the boot manager.

With reference to FIGS. 7 and 8, an exemplary system and method is illustrated which may be used to seal secrets used during boot from processes that take control of computing resources at a later time. The processes revealed in FIGS. 7 and 8 are especially useful in situations where multiple disk partitions are extant on a computer hard drive, although they have other advantages that will be appreciated to be useful in a variety of settings. One advantage of the processes shown in FIGS. 7 and 8 is that they may be used to restrict access by software components to a single partition. While components at the early stages of boot often require access to all disk partitions, components at later stages and after boot may be restricted to a single partition. FIGS. 7 and 8 illustrate exemplary systems and methods for ensuring such restriction.

FIG. 7 provides the setting for the process illustrated in FIG. 8. A plurality of disk partitions is illustrated on the left side of the figure, including Partition A 700, Partition B 702, and Partition C 704. Each partition may be fully encrypted, as will be appreciated by those skilled in the art, except for the information needed for the early stages of boot, which is typically stored in a reserved section such as 701, 703, and 705. Along the bottom of FIG. 7 are software components, including the boot block 706, boot manager 707, and operating system (OS) loader 708 that may serially load as described with reference to FIG. 4. A plurality of PCRs is depicted in the center of FIG. 7, including PCR x 709, PCR y 710, PCR z at time 1 711, and PCR z at time 2 712. The PCRs will typically be identified with numbers rather than letters, but letters are used here to emphasize that the invention is not limited to the particular PCRs used, although some embodiments may use the PCRs discussed in FIG. 8. The PCRs of FIG. 7 serve the function described with reference to FIG. 5—values may be placed therein and a TPM 713 may be trusted to indicate whether the value is correct and/or to grant access to a secret when correct values are entered.

A general concept may be formulated with respect to FIG. 7 prior to a more detailed explanation of the embodiments reflected by FIG. 8. A first value of one or more PCRs, such as the value of PCR z at time 1 711, may be required to acquire access to a boot-only secret, such as a key or BLOB 714 through the TPM 713. The boot only key or BLOB 714 may be useful for decrypting information from a plurality of partitions, as may be required in the early stages of a computer boot. One or more second PCR values, such as that of PCR z at time 2 712, may be required to acquire access to a volume-bound key or BLOB 715. The volume-bound key or BLOB may be useful only for a subset of partitions, such as only for decrypting data from partition A 700. Thus, by using different values in the same PCR at different times and conditioning key or BLOB access to an appropriate key on those multiple values, downstream software components can be blocked from accessing information that is available to boot components. In order for boot to occur properly, a volume-bound key or BLOB 715 must be accessed, which guarantees that the boot-only key or BLOB 714 is no longer accessible. Additional advantages of this system will be apparent to those of skill, especially in combination with the systems and methods illustrated in FIG. 6.

With reference to FIG. 8, various embodiments for implementing a system such as that diagramed in FIG. 7 are shown. Thus, a boot manager component can be loaded in step 800. In systems incorporating the techniques of FIG. 6, the boot manager may be loaded according to the process demonstrated therein. For example, the hash of the boot manager can be measured into PCR 10 in step 801. Next, a boot-access only key may be retrieved from the TPM based not only on the values of all previous measurements, as is typical for TPM usage, but also on the values of PCR [y] and [z], which are for example PCR [11] and [12], and which have not yet been loaded with a measurement and therefore retain their initial value, which is typically zero. Thus, a secret may be retrieved in step 802 based on an initial value of PCR [y] and [z].

Furthermore with reference to FIG. 8, the OS loader component may be loaded into memory and measured by the boot manager in steps 803 and 804. The hash of the OS loader may be placed in PCR [y] 805. Note that this change to PCR [y] effectively revokes future access to the boot-access only secret, thus if the secret is disposed of by the boot manager it is lost to downstream components. PCR [y] may then be compared to a value stored in the boot access only secret 806. For example, if the boot access only secret is a BLOB, a PCR value may be stored with the BLOB. If the comparison is successful, a volume-bound key may be extracted from the boot access only BLOB 807. The volume-bound key may be measured into PCR [z] 808. The TPM may be configured to grant access to a volume-bound secret based on the new PCR values, through PCR [z] 809. Thus, the acquisition of the volume-bound BLOB in step 809 may be conditioned on the inaccessibility of the boot-access only BLOB. In implementations of the invention that utilize this technique, all subsequent processes may be effectively restricted to a subset of partitions associated with the volume-bound key or BLOB.

Exemplary Boot Validation Processes for Protecting System Data

Embodiments of the invention can provide a boot validation process that can be turned on and configured at the command of a user through a user interface (UI). Thus, using a program such as a control panel applet, a UI may be made available that allows a user to enable operation of a boot protection process in accordance with the invention. If the user of a machine has not taken ownership of the machine's TPM, the UI may first present an option to take ownership or cancel. A similar option may be presented to require the user to select a particular boot partition. If the protected boot is configured to operate only with a particular file system, such as New Technology File System (NTFS), the user may be required to select a boot partition that makes use of that file system.

Once the protected boot is enabled from the UI, an automatic process may ensure that the top level secrets to be secured are, where possible, regenerated and then sealed to the expected PCR register values required to unseal the secret. Preferred embodiments may make user of PCR[4], PCR[8] through potentially PCR[15] for this operation. A password may be delegated for the unseal operation, and stored in a publicly visible location. The password selected may therefore be different than that used for the seal operation. A TCG® 1.2 TPM is preferable to support this operation. A variation of this process that may provide higher security allows more PCRs to be specified and can allow the unseal password to be specified by the machine owner and entered early in the boot process.

On a traditional PC or AT computer (PCAT) system, i.e. in x86 based systems using a conventional BIOS, the MBR boot sector, NTFS boot sector, NTFS boot block and Boot Manager may be used to determine expected PCR values. More details on expected PCR values are described below in connection with the exemplary boot sequence. On an Extensible Firmware Interface (EFI) system, relevant files in the EFIU System Partition (ESP) are measured. On a variation of the invention that includes boot volume encryption, a disk decryption key may be sealed to PCRs for the earlier parts of the boot up to and including the NTFS boot block.

To aid in recovery scenarios, other copies of the above secrets may be sealed to a boot that involves recovery via a CDROM; recovery via a special recovery partition if such a partition exists; and recovery via a second method of authentication such as removable media and/or a password.

An exemplary boot process for a PCAT system is provided below. The process demonstrated here may also be understood with reference to FIGS. 8 and 9:

As required by TCG® 1.2 Specification, a read-only portion of ROM may be executed that is responsible to measure BIOS into PCR[0].

BIOS configuration parameters are measured into PCR[1]

Option ROM's are measure into PCR[2]

Option ROM parameters are measured into PCR[3]

MBR is measured into PCR[4]

Partition table is measured into PCR[5]

After measuring MBR, BIOS transfers execution to the MBR

The MBR loads the NTFS Boot sector of the active partition and measures it into PCR[8]. The MBR then transfers execution to this boot sector.

The boot sector loads the boot block into memory (typically 8K). The boot block is measured (excluding encryption information) into PCR[9]. If the volume is encrypted, the encryption information is unsealed at this point and used to decrypt any future sectors loaded from the disk The Boot Manager is read from disk into memory. It is measured into PCR[10]. Execution is transferred into the boot manager. (A variation, as described above, may store the expected PCR[10] measurement amongst the sealed data and use this to validate the correct Boot manager was measured).

The Boot Manager measures critical data into PCR[11]. Critical data may include information that can affect security such as if the debugger is about to be enabled. In some embodiments, this information cannot be acted upon until PCR[11] is extended with it.

The Boot Manager selects an OS Loader into memory, measures it into PCR[12] and transfers execution to it.

The OS Loader measures critical data into PCR[13].

The OS Loader Uses PCR[4], PCR[8-13] and optionally any additional PCR's to unseal secrets used by OS Loader.

The OS Loader Transfers to "Code Integrity" to perform further validation of the system.

Code Integrity validates each future binary loaded by the system, such as phase-0 drivers, NTKRNL and HAL.

NTKRNL begins initial system processes, including LSASS and WinLogon.

LSASS Uses PCR[4], PCR[8-13] and optionally any additional PCR's to unseal SYSKEY. If unseal fails, LSASS determines cause and either suggests a corrective action, and/or requests recovery information to obtain secrets by secondary method.

All code that accesses the encrypted boot volume unseal boot volume decryption secrets using PCR[4], PCR[8-9] and any additionally specified PCR's In an EFI system, several variations to the above process may be beneficial. For instance, instead of measuring the MBR and transferring execution to it, the following actions may be taken:

ROM based Drivers are measured into PCR[2] in addition to Option ROM's.

Disk based Drivers and modules are measured into PCR[4] including Boot Manager.

Any EFI Drivers that understand NTFS have additional ability to unseal boot volume decryption secrets.

The above process, and variations thereof, may be used for purposes beyond a standard computer boot. In particular, two additional purposes are contemplated, although additional uses of the invention are also possible and the invention is not limited to a particular setting or purpose. First, the above process can be extended to encompass the protection of a hibernation file. Second, the above process can be extended to encompass the protection of the boot volume and other volumes required for the operation of the operating system.

With regard to the protection of a hibernation file, this may be acheived by storing the hibernation file encryption and decryption keys amongst the enabling secrets. Encryption and Decryption keys may a single symmetric key, or may be asymmetric keys used to seal another symmetric key. When a machine hibernates, the hibernation file can be encrypted. Unless the machine boots via a validated boot code path, the hibernation file is not decryptable, and therefore any secrets stored within the hibernation file will be maintained. If the machine boots via a validated code path, the hibernation file will be decrypted by the validated code, and execution will resume in a well defined execution path to resume into the security of the running environment.

Protection of the boot volume and other volumes required for the operation of the operating system may also be achieved. In this case, the whole boot volume may be encrypted and/or contain an overall integrity check. The keys required for decryption will only be available to validated boot code; which will then use such keys to decrypt further code and data required to resume the boot of the system. The keys required to update integrity information of the disk will also only be available to validated boot code. A system that includes an overall integrity check, once assured that it is running validated code; is able to select only integrity validated code and data for further operations. An attacker is not able to fool such a system into believing its integrity is valid, because only validated code is able to unseal such enabling bits.

Exemplary Systems and Methods for Repairing and Upgrading a Protected Boot Process Embodiments of the invention may incorporate processes for diagnosing and repairing, as well as upgrading the systems and methods for securely booting a computer. To this end, a first observation for diagnosing problems in a boot process is that, in the protected boot process described above, the process of unsealing a secret provides a means for determining if a measurement is correct or not. There may thus be two states: either the secret will unseal, which indicates that of the code being measured, only validated code has been executed; or it will not unseal, which indicates that it is possible that non-validated code has been executed. For diagnostics, it is possible to determine what failed by inspecting the logs created by the TCG compliant BIOS. This information can then be used to diagnose the problem to give more informative feedback when the error is accidental rather than intentional.

The protected boot process described above relies on self validation of the system by utilizing a TPM. In some embodiments, it is possible for such a system to appear invalid when it is actually still valid. When a system appears to be invalid, there are two resolution paths, either or both of which may be made available in various embodiments of the invention: first, using the information obtained from inspecting the logs, a system may be returned to a state that can be considered valid. Second, a user may authenticate that the system should be considered valid To return a system to a state that can be considered valid, log information may be used to diagnose why the TPM considered the measurement to be invalid. Any code that may have changed can be reverted back to its original state. Alternatively, if the user booted in an unusual manner such as by attempting a network boot before booting off system disk, then a computer may be rebooted in an attempt to boot in an expected manner.

There are a number of additional features that may be incorporated into products to supplement embodiments that return a system to a valid state. For example, if the hardware on the machine is broken and the disk was migrated to another otherwise identical machine; the TPM's secret key may be different. In this case, a user can be authenticated instead of the machine. A number of mechanisms can do that, called a secondary authentication. The credentials for this need not be easily accessible, and can require for example, a phone-call, to re-enable the machine. The secondary authentication may provide the same secrets as that decrypted by the primary TPM method, which may be obtained in another way. Such embodiments may provide stronger security than using the same method as the primary method of authentication. For example, the machine password can be purely randomly generated, not needing to be of a form that is easy to remember. When a machine requires authentication by this secondary method, the user of the machine calls their IT department. The IT department uses their system of choice to validate the identity of the caller, and reads the caller a password. When the password is entered, the migration mechanism described above can be used in this scenario to re-seal the secrets to the new TPM PCR values. In addition, such a system could use a password system that results in a password only being usable once, with the secrets resealed to a new password for the secondary authentication mechanism requiring a new phone call.

Embodiments of the systems and methods for securely booting a computer may be configured to be easily upgraded. Although the code monitored by embodiments of the invention rarely changes it is inevitable that one of these code modules may eventually be changed. In addition, the secrets used in the secure boot process may be sealed to the TPM when the system is initially configured, or after a recovery as described above.

A first method for upgrading one or more boot components may make use of migration that is available after recovery, or after code modification, and can store in a temporary storage until the TPM PCR values are determined. In many embodiments this need not require a reboot, as the PCR values are known at the current boot. However, if the code modules are changed, a reboot will ensure that the new code modules are measured and values stored in the TPM PCRs.

The second method for upgrading one or more boot components may be used in a controlled environment of code modification. In this case, the expected PCR values due to the new code modifications is pre-determined, and the secrets can be sealed to the anticipated PCR values before the system is rebooted.

A running system may perform the migrations described above according to one or more of following non-limiting list of options:
- Prior to a change, for example, a service pack may know it will be changing the OS Loader.
- Immediately after a change, for example, after a disk has been formatted.
- After change detection on a validated system. For example, at shutdown, the system may notice components have legitimately been modified, and silently perform the migration.
- As part of recovery. For example, at system startup, the system may determine a recovery has been performed, and may perform a migration so that the recovery mechanism is not required after the next boot.

Yet another system for maintaining the secure boot process can provide multiple different keys that are created outside the TPM. Each such key can use the same RSA keying material but each key's usage may be bound to different PCR sets and/or passwords. Indeed, such additional keys may be bound to nothing at all. In such embodiments, Then we at least one BLOB may be associated with each disk volume (e.g. partition) that is not bound to anything at all. Each key may be used from a different boot component and ensure the privacy of the BLOB. The password gated key can be used for recovery and the RSA keying material can be escrowed.

While this approach differs only slightly from the secure boot processes described above, significant benefits become clear in maintenance and service: Due to the fact that the RSA keying material was generated outside the TPM and is identical in every key, this RSA material can now be used in a larger scale for multiple users such as employees in a division or of an entire organization. As a result, a master key can be created that allows opening and service for any machine in the organization. The keys are still protected by each TPM's SRK, so the keys can still be considered safe. In this embodiment, however, a central department such as an information technology (IT) department does not have to store one key per machine but rather one key per logical group. It also requires a little less storage space in the boot block to store the multiple keys over multiple BLOBs.

Finally, in the embodiments described above, an administrator can now push down policies and new RSA keys, so the keys are changed frequently on each machine. This will reduce costs in the maintenance of the feature.

Permanent Destruction of Access to Data Using Full Volume Encryption and Protected Boot A byproduct of the secure boot processes described above is that full-volume encryption, i.e. the encryption of almost all the data in a partition, can be efficiently and effectively supported. This can trivialize the effort required to destroy secrets and thereby to destroy the critical information needed to access data on a computer. This effective destruction of data may be valuable in certain settings, in particular, where it is desired to dispose of sensitive data, and more particularly to dispose of such data quickly.

Elimination of the secrets required to operate computers that implement the invention can render such computers unusable without re-installation of software, and can permanently prevent access to data thereon. To accomplish this, the secrets stored inside of the TPM may be reset. This can be trivially done by changing the ownership of the TPM. Any secrets sealed by the TPM are no longer valid. A secondary recovery mechanism must also be destroyed. In the short term however, until this mechanism is destroyed; when the recovery mechanism is kept off-site, it may provide for a way to temporarily disable a machine and then later recover the machine.

When both the secrets stored in the TPM and any recovery mechanism are changed, the content, both code and data, of a machine becomes unobtainable. This very quickly accomplishes a security wipe of a machine. One advantage of such efficient security wiping is that it makes re-sale of a machine to be more practical.

What is claimed:

1. A computer readable storage medium bearing instructions for a secure boot process on a computer with a hardware security module (HSM) that contains recorded values, compares submitted values to the recorded values, and releases a secret if the submitted values are correct, said computer readable medium comprising:

instructions for submitting at least one value to the HSM, wherein if said at least one value is correct, the HSM releases a first secret;

instructions for retrieving the first secret;

instructions for decrypting data using information that is accessible due to retrieving of the first secret, wherein the execution of said instructions for decrypting produces decrypted data;

instructions for at least a portion of a computer boot process, wherein said computer boot process cannot complete a normal boot without said decrypted data; and instructions for submitting at least one replacement value to the HSM to replace the at least one value, wherein said at least one replacement value revokes access to said first secret and, if said replacement value is correct, the HSM releases a second secret required to continue the normal boot.

2. The computer readable storage medium of claim 1, wherein the HSM is a trusted platform module (TPM), and the at least one value and the at least one replacement value are placed in at least one platform configuration register (PCR).

3. The computer readable storage medium of claim 1 wherein the decrypted data comprises a software component used in the computer boot process.

4. The computer readable storage medium of claim 1 wherein the decrypted data comprises information which a software component used in the computer boot process requires in order to continue the computer process.

5. The computer readable storage medium of claim 1 wherein the decrypted data comprises information which is required in order to access data stored on a computer readable medium.

6. The computer readable storage medium of claim 1, further comprising instructions for removing the first secret from memory.

7. A computer comprising a hardware security module (HSM) that contains recorded values, compares submitted values to the recorded values, and releases a secret if the submitted values are correct, said computer also comprising:

means for submitting at least one value to the HSM, wherein if said at least one value is correct, the HSM releases a first secret;

means for retrieving the first secret;

means for decrypting data using information that is accessible due to retrieving of the first secret, wherein the operation of said means for decrypting produces decrypted data;

means comprising at least a portion of a computer boot process, wherein said computer boot process cannot complete a normal boot without said decrypted data; and means for submitting at least one replacement value to the HSM to replace the at least one value, wherein said at least one replacement value revokes access to said first secret and, if said replacement value is correct, the HSM releases a second secret required to continue the normal boot.

8. The computer of claim 7, wherein the HSM is a trusted platform module (TPM) and the at least one value and the at least one replacement value are placed in a platform configuration register (PCR).

9. The computer of claim 7, wherein the decrypted data comprises a software component used in the computer boot process.

10. The computer of claim 7, wherein the decrypted data comprises information which a software component used in the computer boot process requires in order to continue the computer process.

11. The computer of claim 7, wherein the decrypted data comprises information which is required in order to access data stored on a computer readable medium.

12. The computer of claim 7, further comprising means for removing the first secret from memory.

13. A computer readable storage medium bearing instructions for a secure boot process on a computer with a plurality of partitions and a hardware security module (HSM) that contains recorded values, compares submitted values to the recorded values, and releases a secret if the submitted values are correct, said computer readable medium comprising:

instructions for submitting at least one value to the HSM, wherein if said at least one value is correct, the HSM releases a first secret;

instructions for retrieving the first secret;

instructions for removing the first secret from a memory location;

instructions for submitting at least one second value to the HSM, wherein if said second value is correct, the HSM releases a second secret and not the first secret.

14. The computer readable storage medium of claim 13, wherein the HSM is a trusted platform module (TPM) and the at least one value and the at least one second value is placed in a platform configuration register (PCR).

15. The computer readable storage medium of claim 13, further comprising instructions for at least a portion of a computer boot process, wherein said computer boot process cannot complete a normal boot without the first secret.

16. The computer readable storage medium of claim 13 wherein the second secret is required in order to access substantially all data stored on at least one partition of a computer readable medium.

17. The computer readable storage medium of claim 13 wherein the first value comprises a hash of a software component used in a computer boot process.

18. The computer readable storage medium of claim 13 wherein the second value comprises a hash of a decryption key.

19. The computer readable storage medium of claim 13 wherein at least one of the first secret and the second secret is a Binary Large Object (BLOB).

20. The computer readable storage medium of claim 13 wherein at least one of the first secret and the second secret is a decryption key.

* * * * *